Sept. 19, 1939.   J. O. BAKER   2,173,220
MOVING PICTURE APPARATUS
Filed Jan. 30, 1937   2 Sheets-Sheet 1
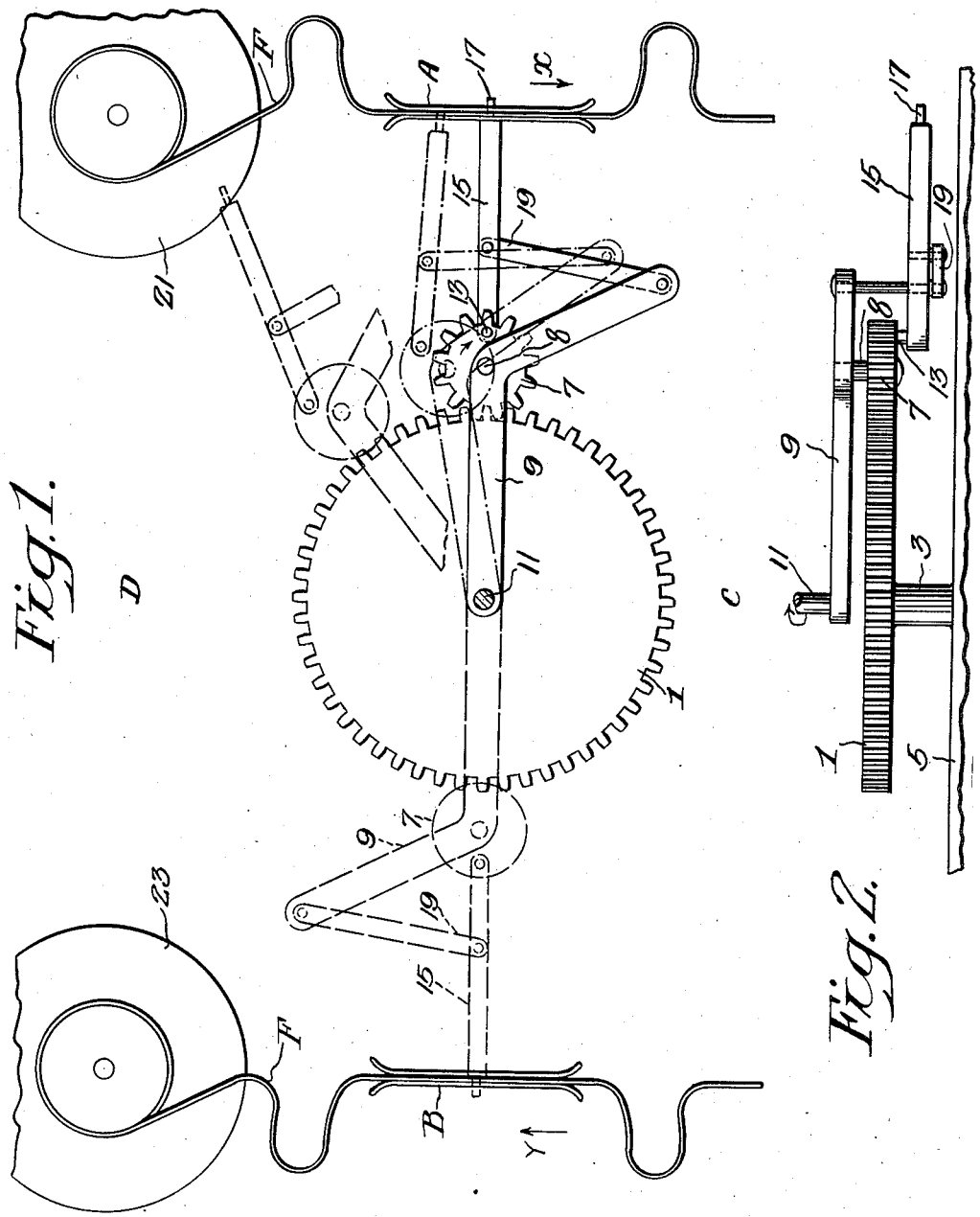
Inventor
Judd O. Baker
By
J. Huff
Attorney Sept. 19, 1939.     J. O. BAKER     2,173,220
MOVING PICTURE APPARATUS
Filed Jan. 30, 1937     2 Sheets-Sheet 2
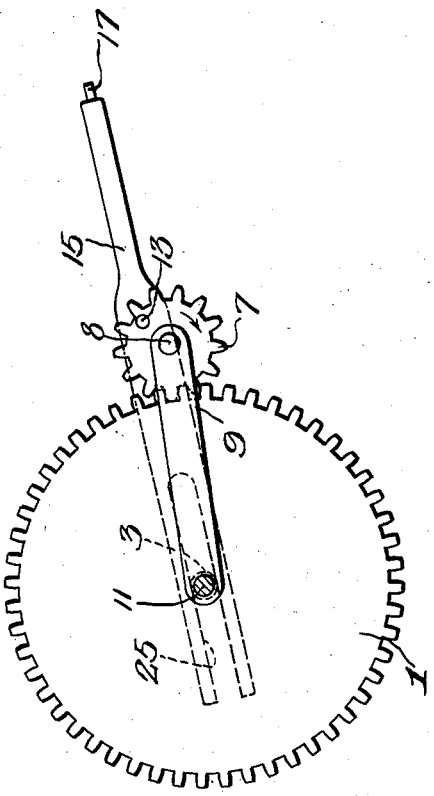
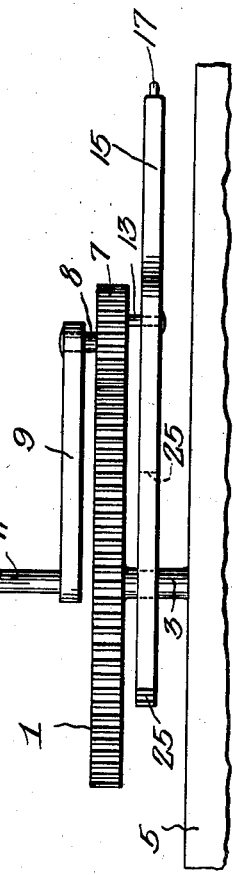
Inventor
Judd O. Baker
Attorney Patented Sept. 19, 1939

2,173,220

UNITED STATES PATENT OFFICE 2,173,220

MOVING PICTURE APPARATUS

Judd O. Baker, Camden, N. J., assignor to Radio Corporation of America, a corporation of Delaware Application January 30, 1937, Serial No. 123,274

4 Claims. (Cl. 88—18.4)

This invention relates to moving picture apparatus, and more particularly to intermittent film feeding mechanism therefor.

The primary object of my invention is to provide novel moving picture apparatus of the intermittent type wherein a single intermittent mechanism is adapted to feed one or more films through the apparatus at a plurality of separated points.

Another object of my invention is to provide an improved intermittent film feeding mechanism which is characterized by a short film feeding period and which is arranged to permit a relatively long light exposure interval for the film in order to provide maximum screen illumination.

Still another object of my invention is to provide an improved intermittent film feeding mechanism as aforesaid which is quiet in operation.

A further object of my invention is to provide an improved intermittent film feeding mechanism which will permit facile threading of the film.

It is also an object of my invention to provide an improved film feeding mechanism of the type set forth which is highly efficient in operation, which is comprised of a minimum number of parts consistent with such efficiency, and which is economical of manufacture.

In accordance with my present invention, I mount a film engaging claw eccentrically upon a planetary gear which is arranged to rotate upon a relatively large, stationary sun gear. The claw is guided for to and fro movement in response to rotation of the planetary gear as the latter moves in its orbit about the sun gear, and the number of such to and fro excursions of the claw during one 360° movement of the planetary gear in its orbit will, of course, depend upon the ratio of the two gears. Thus, by proper choice of these gears, the same claw may be made to partake of "$n$" to and fro excursions during a single cycle, where "$n$" is the ratio of the two gears, and therefore the same intermittent claw may be employed to drive one or more films through the apparatus at "$n$" different points.

The novel features that I consider characteristic of my invention are set forth with particularity in the appended claims. The invention itself, however, both as to its organization and method of operation, together with additional objects and advantages thereof, will best be understood from the following description of a specific embodiment thereof when read in connection with the accompanying drawings, in which Figure 1 is a front elevation of one form of my invention, Fig. 2 is an end elevation thereof, Fig. 3 is a front elevation of a modified form of my invention, and Fig. 4 is an end elevation of the latter form of my invention.

Referring more specifically to the drawings, wherein similar reference characters designate corresponding parts throughout, there is shown a stationary gear 1 which may be fixedly mounted upon a stub shaft 3 extending from a suitable support 5 of the apparatus; the gear 1 being relatively large and acting as a sun gear with which a small planetary gear 7 is in mesh. The gear 7 is rotatably mounted at its center on a pin 8 fixed to a somewhat L-shaped arm 9 which, at one end, is fixed to a rotatable shaft 11, such as the conventional driving shaft which operates at 1440 R. P. M. in moving picture projectors, for rotation therewith. Thus, as the arm 9 is rotated, it carries the gear 7 around in its orbit about the sun gear 1, the latter causing the gear 7 to turn upon itself.

Loosely mounted upon a pin 13 which is eccentrically fixed to the gear 7 is an arm 15 having a film engaging claw 17 on its free end. A link 19 is pivoted on the free end of the arm 9 and also on the claw arm 15, the link 19 serving to confine the claw arm 15 to reciprocatory, or to and fro, movement in response to the planetary gear 7 as the latter rotates upon the sun gear 1 while moving bodily in its orbit.

From the foregoing description, it will be apparent that, where the planetary gear 7 is smaller than the sun gear 1, the former gear will make a number of revolutions upon its pin 8 every time it moves bodily through 360° in its orbit. Hence, the claw arm 15 will move to and fro the same number of times. Assuming, for example, that the gears 1 and 7 have a ratio of 4:1, the claw 15 will move to and fro four times as it is carried along with the gear 7 by the arm 9. Thus, the claw 17 is adapted to engage the film at four different points in the apparatus to advance the same intermittently at each point.

In the drawings, I have shown a supply reel 21 from which a film F may be suitably drawn and directed to an operating station, such as a film gate of any suitable type located at a point designated A, where the claw 17 will pass through one of its maximum points of advance during the cycle. At this point, therefore, the claw 17 will engage the film F and will advance it one frame in the well known manner. At another point in the apparatus marked B, which is diametrically opposite the point A with reference to the orbit of the gear 7, there may be located another film gate. Since the claw arm 15 will pass through another of its maximum points of advance at the gate B, it may be employed to advance either the same or another film through the latter gate also. For the case assumed, the same will be true of the two other locations C and D also diametrically opposite each other with reference to the orbit of the gear 7, and displaced 90° from a line connecting the gates A and B. It will be understood that the ratio of 4:1 has been chosen merely by way of example and that any other suitable ratio between the gears 1 and 7 may be chosen depending upon the number of successive points at which it is desired to advance the film F which, after passing through the last film gate, may be wound up on a take-up reel 23. It is not necessary, of course, that the film be advanced through each of the gates, and certain ones may be omitted, if desired. Thus, the film F may be fed only through the gates A and B, being advanced in the direction of the arrow X through the gate A and in the opposite direction, as shown by the arrow Y, through the gate B when the planetary gear 7 is rotated in the direction of the arrow appended thereto in Fig. 1.

In general, it is desirable that the ratio between the two gears 1 and 7 shall be a small whole number, but in any case, it must be a whole number. This will permit a fast pull down in each of the gates and will provide maximum screen illumination without danger of tearing the film. I have found that, with a construction as described above, a 20° pull down can be attained without difficulty. In connection with the gate B, an inverted optical system may be used since the film is advanced upwardly therein. If desired, two separate films may be employed, one for projection through the gate A and the other through the gate B.

In the modifications shown in Figs. 3 and 4, the claw arm 15 is provided with a slot 25 which embraces the shaft 3, and the connecting link 19 of the modification of Figs. 1 and 2 is entirely omitted. The operation of this form of my invention is similar to that previously described, the claw arm 15 being guided by the shaft 3 and the slot 25 for "n" to and fro movements during each movement bodily of the planetary gear in its orbit about the gear 1.

Although I have shown and described but two embodiments of my invention, it will be apparent to those skilled in the art that many other modifications and various changes in those shown and described are possible. It should be noted, however, that in each case, the axis of rotation of the arm 9 should coincide with, or be in alignment with, the axis of the stationary shaft 3, and with this limitation in mind, many further modifications will, no doubt, readily suggest themselves to those skilled in the art. I, therefore, desire that my invention shall not be limited except insofar as is made necessary by the prior art and by the spirit of the appended claims.

I claim as my invention:

1. Film advancing mechanism comprising, in combination, a sun element, a planetary element associated therewith, film engaging means having eccentric connection with said planetary element, means for guiding said film engaging means to move to and fro relative to said planetary element upon rotation of said planetary element, and means for causing said planetary element to rotate about said sun element whereby to impart to and fro movement to said film engaging means.

2. Film advancing mechanism comprising, in combination, a stationary sun gear, a planetary gear, means for holding said planetary gear in rotary engagement with said sun gear, a film engaging claw having eccentric connection with said planetary gear, means for guiding said claw to move to and fro relative to said planetary gear upon rotation of said planetary gear, and means for causing said planetary gear to rotate on said sun gear element to effect to and fro movement of said claw.

3. Film advancing mechanism comprising, in combination, a stationary sun gear, a planetary gear, supporting means mounted for rotation on an axis coinciding with that of said sun gear, said planetary gear being rotatably supported at its center by said supporting means in engagement with said sun gear, a film engaging claw having eccentric connection with said planetary gear, means for guiding said claw to move to and fro relative to said planetary gear upon rotation of said planetary gear, and means for imparting rotation to said supporting means on its axis whereby to cause said planetary gear to rotate on said sun gear and thereby effect to and fro movement of said claw.

4. Film advancing mechanism comprising, in combination, a stationary sun gear, a planetary gear meshing therewith, a supporting arm mounted for rotation on an axis coinciding with that of said sun gear, said planetary gear being rotatably supported at its center by said arm, a film engaging claw eccentrically mounted on said planetary gear whereby, upon rotation of said planetary gear, said claw is adapted to move to and fro relative to said planetary gear, means for rotating said arm through 360° whereby to cause said planetary gear to rotate on said sun gear, and means loosely coupling said arm and said claw for effecting to and fro movement of said claw upon rotation of said planetary gear.

JUDD O. BAKER.